United States Patent [19]

Paull et al.

[11] 4,003,432

[45] Jan. 18, 1977

[54] METHOD OF RECOVERY OF BITUMEN FROM TAR SAND FORMATIONS

[75] Inventors: Peter L. Paull, Weston; Fontaine C. Armistead, Darien, both of Conn.

[73] Assignee: Texaco Development Corporation, New York, N.Y.

[22] Filed: May 16, 1975

[21] Appl. No.: 578,243

[52] U.S. Cl. .............................. 166/271; 166/273; 166/240; 166/302

[51] Int. Cl.² .................. E21B 43/22; E21B 43/24; E21B 43/26

[58] Field of Search .......... 166/268, 271, 273, 274, 166/280, 302, 308, DIG. 1

[56] References Cited

UNITED STATES PATENTS

| | | | |
|---|---|---|---|
| 2,621,022 | 12/1952 | Bardill | 166/302 X |
| 2,859,818 | 11/1958 | Hall et al. | 166/274 X |
| 2,944,803 | 7/1960 | Hanson | 166/271 X |
| 3,217,791 | 11/1965 | Long | 166/DIG. 1 |
| 3,220,474 | 11/1965 | Holm | 166/273 |
| 3,405,762 | 10/1968 | Terwilliger | 166/308 |
| 3,602,310 | 8/1971 | Halbert | 166/271 X |
| 3,729,053 | 4/1973 | Froning | 166/273 X |
| 3,756,317 | 9/1973 | Hall | 166/302 X |
| 3,759,329 | 9/1973 | Ross | 166/302 X |
| 3,811,506 | 5/1974 | Carlin | 166/274 |

*Primary Examiner*—Stephen J. Novosad
*Assistant Examiner*—George A. Suchfield
*Attorney, Agent, or Firm*—T. H. Whaley; C. G. Ries; Kenneth R. Priem

[57] ABSTRACT

A competent permeable communication zone connecting injection and production wells completed in a tar sand which communication zone will be rigid and will not tend to slump or heal may be developed by injecting a fluid in the injection well under such pressure so as to fracture the tar sand formation between the injection well and the production well and circulating a fluid between the injection and production wells which is at a temperature sufficiently low to freeze the water in tar sands. The fluid may contain propping agents to hold the fracture surfaces apart. This procedure will rigidify the hydrocarbon portion of the tar sand formation in the vicinity of the fracture zone as well as freeze the water in the tar sand formation. Once the fracture is established a solvent for the hydrocarbon in the tar sands may be circulated preferably at a temperature below the freezing point of the water in the tar sands to extract the bitumen therefrom.

12 Claims, No Drawings

METHOD OF RECOVERY OF BITUMEN FROM TAR SAND FORMATIONS

BACKGROUND OF THE INVENTION

1. Field of the Invention

This invention relates to methods for recovering tar sands by establishing communication between an injection well and a production well penetrating a tar sand bed.

2. Description of the Prior Art

There are a number of known bitumen containing tar sand reservoirs scattered around the world. One of the largest of these is the deposit located in the Athabasca region of Alberta, Canada. The invention disclosed herein will operate in any tar sand bed; however, since the Athabasca tar sand deposit is well known the following discussion will mention it specifically.

The Athabasca tar sand deposit has a lateral area of several thousand square miles. The bitumen or oil bearing sandstone reservoir is exposed at ground surface is some areas of the deposit. Where this phenomenon occurs, open pit mining operations may take place. In these operations, oil and sand are separated in a plant. The greatest part of the deposit, however, is covered with overburden which can range up to 1000 feet in thickness. Where substantial overburden occurs, the deposit cannot be economically mined by open pit methods. Consequently, researchers in the field have worked toward developing an in situ method suitable for recovering the oil. The oil sand is mainly comprised of water wet quartz grains. The oil or bitumen is located in the interstices between the water sheathed grains and actually forms the matrix of the reservoir since the quartz grains are not in contact with one another.

The oil present in and recoverable from the Athabasca tar sands is usually a rather viscous material ranging in specific gravity from slightly below one to about 1.04 or somewhat greater. At a typical reservoir temperature, e.g., about 48° F, this oil is a plastic material having a viscosity exceeding several thousand centipoise. At higher temperatures such as above about 200° F, this oil becomes mobile with viscosities of less than about 343 centipoises. At reservoir temperatures then, it is evident that the oil cannot be pushed through the formation to a production well using conventional means such as a pressure gradient.

Thus, researchers have devised means for unlocking the subterranean tar sand so as to recover the contained oil. Most of these investigations have been concerned with converting the oil to a less viscous state so that it can be driven to and recovered from production wells using conventional pumping or gas lift methods. Many of these procedures are designed to heat the reservoir with steam or hot hydrocarbons so as to render the bitumen mobile. Other procedures involve spontaneously emulsifying the oil to form an oil and water emulsion and can be moved to production wells.

In these methods, the prior art teaches drilling production and injection wells into the formation and fracturing the tar sands horizontally to establish communication between the wells. After communication is established, the prior art methods then pump steam or an emulsifying fluid through the fracture system. One problem with these systems, is that the emulsion cools as it moves away from the hot zones surrounding the injection well and as it cools, the oil again solidifies to form an impermeable block in the fracture system. Another problem is that the tar sand even at temperatures from 40°–50° F is a plastic solid material which under the enormous overburden will slowly flow into the fracture zone thereby blocking it.

Thus, these prior art processes are hampered by the fact that the fracture will not maintain itself for long periods of time even though propped with extraneous materials. It is an object of our invention to present a method for fracturing a tar sand formation whereby the fracture is given rigidity and permanence.

SUMMARY OF THE INVENTION

The present invention is a method for fracturing a tar sand formation between an injection well and a production well in communication with the tar sand formation. The method comprises injecting a fluid into the injection well under sufficient pressure to fracture the tar sand formation between the injection well and the production well and then circulating a fluid between the injection and production wells which is at a temperature sufficiently low to freeze the water in the tar sands and to solidify the hydrocarbon portion of the tar sands. This circulating fluid may be the same as or different than the fluid used to create the fracture. The fracturing fluid should contain propping agents and the circulation of the circulating fluid should be maintained for a period of time sufficient to affect a considerable area away from the fracture face. The invention is also a method for recovering oil from a tar sand fractured in the above manner by circulating a solvent for the hydrocarbon in the created fracture between injection and production wells. The solvent is preferably at a temperature low enough to maintain the rigidity of the created fracture. The solvent carries the leached bitumen to the surface where it may be recovered.

DESCRIPTION OF THE PREFERRED EMBODIMENTS

The method of our invention discloses a process for fracturing a tar sand deposit and rendering the area around the fracture rigid so that the fracture will not heal by plastic flow. This is accomplished by establishing communication, i.e., by fracturing the formation between an injection and production well and then contacting the created fracture with a cold fluid which is at a temperature sufficient to freeze the water in the formation and to solidify the bitumen. The method of the invention may have many variations all of which cannot be discussed here, but one skilled in the art may be able to devise an equivalent method which is in the scope of the invention.

In one embodiment of the invention, a fluid may be pumped into the injection well to fracture the formation. Then either the same fluid or another may be circulated at cold temperatures in the fracture zone to cool the formation so as to render it more rigid. This fracture and/or cooling fluid may be any fluid available to those in the field, including water, LPG, and cold gases still in a gaseous state such as carbon dioxide. The function of this cooling fluid is to remove heat from the formation thus lowering the temperature in the vicinity of the fracture zone. Thus, the cooling fluid should be at a temperature below original formation temperature. In a particular embodiment of the invention, the fluid should cool the fracture surfaces to a point where the water in the vicinity of the fracture zone is frozen and the bitumen is rigid. This fluid may be circulated for any length of time sufficient to perform the function of lowering the temperature a desired amount in a desired volume of reservoir. Once the formation is sufficiently cooled in the area of the fracture, propping agents would be introduced along with the cooling fluid to help support the fracture. Proppant may be introduced with the fracturing fluid. If proppant is introduced at a time much after the initial fracturing operation, care must be taken to maintain the fracture opening by pressure until proppant is introduced. These propping agents may be any of those known to those in the fracturing art. One unique propping agent could be fragments of solid carbon dioxide which would perform the function of not only supporting the fracture for a time, but also of cooling the formation and maintaining the temperature at a desired level.

Another embodiment of the invention is to establish communication between the injection well and production well with a gas prior to fracturing. This gas may be nitrogen, methane, carbon dioxide, or any number of gases available to those in the field, including exhaust gases. It has been found that in some cases a gas will establish communication in a tar sand bed more rapidly than a liquid thus facilitating the fracturing process.

Thus formed, the rigid fracture in the tar sand bed may be used as the vehicle for recovering oil from the tar sand formation in many conventional ways. One such method would be to introduce a hot fluid such as steam into the fracture zone, although this method would not be preferred since it would warm the fracture zone and cause the advantages of cooling the fracture zone to be lost. Another embodiment of the invention would be to circulate through the fracture zone a solvent for the bitumen in the formation. The solvent should preferably be at a low enough temperature so that the bitumen in the fracture zone is maintained in its rigid state. It is particularly preferred for the circulating solvent to be cold enough so that the water in the fracture zone remains frozen. This solvent will dissolve the bitumen in the fracture zone carrying it to the surface. If the solvent was sufficiently cold, it will also carry water to the surface in the form of ice crystals which could easily be separated from the dissolved bitumen without the problem of emulsification.

Any solvent capable of dissolving the viscous petroleum or bitumen contained in the formation to which the process is to be applied resulting in the formation of a single (liquid) phase solution of solvent and bitumen having a viscosity substantially less than the viscosity of the virgin bitumen may be used as the solvent of our process. Aliphatic or aromatic hydrocarbons capable of dissolving bitumen are suited for this process. Mixtures of aliphatic and aromatic hydrocarbons may also be used as well as hydrocarbons containing both aromatic and aliphatic characteristics. Suitable aromatic hydrocarbons include mononuclear and polynuclear species.

Aliphatic hydrocarbons, specifically linear or branched paraffinic hydrocarbons having from 4 to 10 carbon atoms, are suitable materials for use in practicing the process of the invention. For example, butane, pentane, hexane, heptane, octane, etc. and mixtures thereof as well as commercial blends such as natural gasoline will function as a satisfactory liquid solvent in many bitumen-containing formations.

Of course, a solvent used in this process should have a low freezing point, preferably below the freezing point of water in the formation. Also, it has been noted that some aliphatic solvents are not satisfactory bitumen solvents. Therefore, laboratory testing to choose a proper solvent is in order.

Mononuclear aromatic hydrocarbons, especially benzene, toluene, xylene or other substituted aromatic materials as well as multiple ring aromatic compounds such as naphthalene are excellent solvents for use in the process as they will usually dissolve bitumen totally. Many of these mononuclear aromatic compounds freeze at higher temperatures than water. Therefore, especially preferred solvents of this class are those with freezing points below that of water such as toluene and meta- and ortho-xylene. Economics will generally dictate that only the simpler compounds such as toluene or xylene or mixtures thereof will be used.

A mixture of aliphatic and aromatic hydrocarbons such as pentane and toluene comprise an excellent solvent for the process of this invention. Mixed aromatic solvents are frequently available from processing streams of refineries which contain a mixture of benzene, toluene, xylene and a substantial amount of paraffinic materials such as propane or butane. Such materials are economic solvents and frequently the materials are very satisfactory. This can best be determined by simple tests utilizing the solvent under consideration and a sample of the bitumen from the formation. Mixtures of any of the above described compounds may also be used as the solvent in the practice of our invention.

Carbon disulfide and chlorinated methane such as carbon tetrachloride are also suitable solvents for use in this invention.

Any hydrocarbon solvent which is gaseous at about 75° F at atmospheric pressure may also be used as the solvent in the process of our invention either alone or in combination with a liquid solvent. Low molecular weight paraffinic hydrocarbons such as methane, ethane, propane and butane as well as olephinic hydrocarbons such as ethylene, propylene or butylene may be used.

It is preferred that the solvent be at a temperature below the freezing point of the water contained in the tar sand formation, although this invention encompasses the use of solvent at temperatures above the freezing point of the water. Of course, in the practice of this embodiment only solvents which freeze at temperatures lower than the freezing point of the formation water are suitable. Toluene and meta- and ortho-xylene are examples of solvents having low freezing points. If the solvent is at a temperature below the freezing point of the water, an additional benefit may accrue. That is, as the solvent dissolves the bitumen, it will also carry ice crystals to the surface through the production well. These solid crystals of ice may be removed efficiently by filtration or other methods and a water-free solvent bitumen mixture may then be obtained. In the prior art, methods which produce bitumen and liquid water also produced a great deal of emulsion between the bitumen and the water. Such emulsions are very difficult to break and have often caused the downfall of other processes.

It is also an embodiment of this invention to use the same fluid as the fracturing fluid as is used to cool the formation and to be the solvent to recover the bitumen. The selection of the fluids for each of these functions may be up to those skilled in the art considering the particular situation involved. However, it is within the scope of this invention that these fluids may be different from each other or that any two may be the same or that they may all be the same fluid.

FIELD EXAMPLE

In order to better understand the process of this invention, the following field example is offered as an illustrative embodiment of the invention. However, it is not meant to be limitative or restrictive thereof.

A tar sand deposit is located at a depth of 450 feet and the thickness of the deposit is 70 feet. Since the ratio of overburden thickness to tar sand deposit thickness is considerably greater than 1, the deposit is not economically suitable for strip mining. It is determined that the most attractive method of producing this particular reservoir is by means of solvent flooding. It is further determined that it would be desirable to establish communication between production and injection wells by means of a fracture in the formation and then to circulate a solvent through the fracture.

As a first step, water is injected into the injection well under such pressure so as to force a fracture to develop between the injection and production wells. Once communication is established, toluene is circulated in the fracture zone between the injection and production wells. Its temperature, 0° F, is well below the freezing point of the water in the formation, and it will quite adequately render the bitumen in the formation rigid. The toluene is circulated for several days allowing the formation in the vicinity of the fracture zone to become quite rigid, due to the low temperature of the toluene. Sand is then placed in the circulating toluene to fill the fracture zone and prop it. The toluene at 0° F is continued circulating in the fracture between the injection well and the production well. The toluene being a solvent for bitumen carries dissolved bitumen to the surface along with ice crystals. These ice crystals are filtered and the bitumen and solvent are separated by distillation. The toluene may then be reinjected into the injection well and the continuous process of solvent extraction continued.

We claim:
1. A method for fracturing a tar sand formation penetrated by an injection well and a production well consisting of
   a. forcing a first fluid down the injection well under sufficient pressure to fracture the formation between the injection well and the production well and
   b. circulating a second fluid in the fracture between the injection well and the production well at a temperature below the original temperature of the tar sand formation.
2. A method as in claim 1 wherein the second fluid is at a temperature below the freezing point of any water in the tar sand formation.
3. A method as in claim 1 wherein the first fluid and the second fluid are the same.
4. A method for recovering hydrocarbons from a tar sand formation wherein at least one injection well and one production well are in communication with the tar sand formation consisting of:
   a. injecting a first fluid containing proppant into the injection well under such pressure so as to fracture the tar sand formation between the injection well and the production well;
   b. circulating a second fluid in the fracture between the injection and production wells which is at a temperature below the original formation temperature in the tar sands, and
   c. circulating a third fluid which is a solvent for the hydrocarbons in the fracture between the injection well and the production well to dissolve the hydrocarbons in the tar sand formation and carry them to the surface.
5. A method as in claim 4 wherein said second fluid is at a temperature below the freezing point of the water in the tar sand formation.
6. A method for recovering hydrocarbons from tar sand formations where at least one injection well and one production well are in communication with the tar sand formation comprising:
   a. injecting a first fluid containing proppant into the injection well under such pressure so as to fracture the tar sand formation between the injection well and the production well,
   b. circulating a second fluid in the fracture between the injection and production wells which is at a temperature below the freezing point of the water in the tar sand formation, and
   c. circulating a third fluid selected from the group consisting of toluene, meta-xylene and ortho-xylene in the fracture between the injection well and the production well at a temperature below the freezing point of the water in the formation to dissolve the hydrocarbons in the tar sand and carry them to the surface.
7. In a method for fracturing a tar sand formation penetrated by an injection well and a production well wherein a first fluid is forced down the injection well under sufficient pressure to fracture the formation between the injection well and the production well the improvement which comprises:
   circulating a second fluid in the fracture between the injection well and the production well at a temperature below the original temperature of the tar sand formation wherein the second fluid is selected from the group consisting of toluene, meta-xylene and ortho-xylene.
8. In a method for fracturing a tar sand formation penetrated by an injection well and a production well wherein a first fluid is forced down the injection well under sufficient pressure to fracture the formation between the injection well and the production well the improvement which comprises:
   circulating a second fluid in the fracture between the injection well and the production well at a temperature below the original temperature of the tar sand formation wherein the second fluid contains solid dioxide crystals which are left in the fracture.
9. A method for recovering hydrocarbons from a tar sand formation wherein at least one injection well and one production well are in communication with the tar sand formation comprising:
   a. injecting a first fluid containing proppant into the injection well under such pressure so as to fracture the tar sand formation between the injection well and the production well;
   b. circulating a second fluid in the fracture between the injection and production wells which is at a temperature below the original formation temperature in the tar sands wherein the second fluid selected from the group consisting of toluene, meta-xylene and ortho-xylene is below the freezing point of the water in the tar sand formation, and c. circulating a third fluid which is a solvent for the hydrocarbons in the fracture between the injection well and the production well to dissolve the hydrocarbons in the tar sand formation and carry them to the surface.

10. A method for recovering hydrocarbons from a tar sand formation wherein at least one injection well and one production well are in communication with the tar sand formation comprising:
   a. injecting a first fluid containing proppant into the injection well under such pressure so as to fracture the tar sand formation between the injection well and the production well;
   b. circulating a second fluid in the fracture between the injection and production wells which is at a temperature below the original formation temperature in the tar sand, and
   c. circulating a third fluid which is a solvent for the hydrocarbons in the fracture between the injection well and the production well to dissolve the hydrocarbons in the tar sand formation and carry them to the surface wherein the third fluid is at a temperature below the freezing point of water in the tar sand formation.

11. A method for recovering hydrocarbons from a tar sand formation wherein at least one injection well and one production well are in communication with the tar sand formation comprising:
   a. injecting a first fluid containing proppant into the injection well under such pressure so as to fracture the tar sand formation between the injection well and the production well;
   b. circulating a second fluid in the fracture between the injection and production wells which is at a temperature below the original formation temperature in the tar sand, and
   c. circulating a third fluid which is a solvent for the hyrocarbons in the fracture between the injection well and the production well to dissolve the hydrocarbons in the tar sand formation and carry them to the surface wherein the third fluid is at a temperature below the freezing point of water in the tar sand formation and is selected from the group consisting of toluene, meta-xylene and ortho-xylene.

12. A method for recovering hydrocarbons from a tar sand formation wherein at least one injection well and one production well are in communication with the tar sand formation comprising:
   a. injecting a first fluid containing proppant comprising solid carbon dioxide crystals into the injection well under such pressure so as to fracture the tar sand formation between the injection well and the production well; and
   b. circulating a second fluid in the fracture between the injection and production wells which is at a temperature below the original formation temperature in the tar sands, and
   c. circulating a third fluid which is a solvent for the hydrocarbons in the fracture between the injection well and the production well to dissolve the hydrocarbons in the tar sand formation and carry them to the surface.

* * * * *